(12) United States Patent
Kalaidjian

(10) Patent No.: US 8,405,652 B1
(45) Date of Patent: Mar. 26, 2013

(54) THREE-DIMENSIONAL VISUALIZATION OF A FORM

(75) Inventor: Alex Kalaidjian, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 848 days.

(21) Appl. No.: 12/206,986

(22) Filed: Sep. 9, 2008

(51) Int. Cl.
*G06T 15/00* (2011.01)

(52) U.S. Cl. ........................................ 345/419

(58) Field of Classification Search ........... 345/419–420
See application file for complete search history.

(56) References Cited

U.S. PATENT DOCUMENTS

| | | | | |
|---|---|---|---|---|
| 5,835,094 A * | 11/1998 | Ermel et al. | .................. | 715/848 |
| 6,014,458 A * | 1/2000 | Wang | ............................ | 382/176 |
| 6,289,299 B1 * | 9/2001 | Daniel et al. | .................... | 703/21 |
| 6,414,677 B1 * | 7/2002 | Robertson et al. | ............ | 345/419 |
| 6,700,578 B2 * | 3/2004 | Kamata et al. | ................ | 345/473 |
| 6,906,712 B2 * | 6/2005 | Lee et al. | ...................... | 345/420 |
| 7,333,108 B2 * | 2/2008 | Takahashi | ..................... | 345/427 |
| 7,453,458 B1 * | 11/2008 | Komooka et al. | ............. | 345/422 |
| 7,661,071 B2 * | 2/2010 | Blanco | ........................... | 715/782 |
| 7,761,135 B2 * | 7/2010 | Pfister et al. | .................. | 600/424 |
| 7,870,509 B2 * | 1/2011 | Cao et al. | ...................... | 715/853 |
| 2005/0083326 A1 * | 4/2005 | Fujita et al. | ................... | 345/419 |

OTHER PUBLICATIONS

Card et al., The WebBook and the Web Forager: An Information Workspace for the World-Wide Web, Proceedings of the SIGCHI Conference on Human Factors in Computing Systems: Common Ground, 1996.*

* cited by examiner

*Primary Examiner* — Xiao M. Wu
*Assistant Examiner* — Charles Tseng
(74) *Attorney, Agent, or Firm* — Schwegman Lundberg Woessner P.A.

(57) ABSTRACT

The embodiments described herein provide various techniques for visually representing a form. For example, objects associated with a form and the hierarchical relationships between the objects may be identified. Three-dimensional representations of the identified objects are then displayed. The positioning of the three-dimensional representations as displayed is based on the hierarchical relationships between the objects.

18 Claims, 8 Drawing Sheets

THREE-DIMENSIONAL VISUALIZATION OF A FORM

FIELD

The present disclosure relates generally to form presentation, and more particularly, in an example embodiment, relates to a three-dimensional visualization of a form.

BACKGROUND

When designing a form, a user may arrange objects that comprise the form into various groups. For organizational purposes, as an example, a user may arrange the groups of objects in a hierarchical structure where the groups are ranked relative to each other. The relationships between the groups are typically displayed as a flat hierarchal tree in a window region next to another window region that displays the form as laid out on a canvas. This hierarchal tree allows a user to see the relationships between the groups of objects and also to select particular groups or an individual object of interest.

It should be noted that a form may have many groups of objects. As an example, a form may have hundreds of objects and the objects may be grouped into multiple levels of subgroups. The window region that displays the hierarchal tree has limited viewing area and, as a result, such a window region can only display a portion of the hierarchical tree. Such a display provides a user with a limited view of the relationships and can make the identification of relationships between the groups difficult when the user is designing the form.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for visually representing a form. For example, objects associated with a form and the hierarchical relationships between the objects may be identified. Three-dimensional representations of the identified objects are then displayed. As will be explained in more detail below, the positioning of the three-dimensional representations as displayed is based on the hierarchical relationships between the objects.

Figure 1:
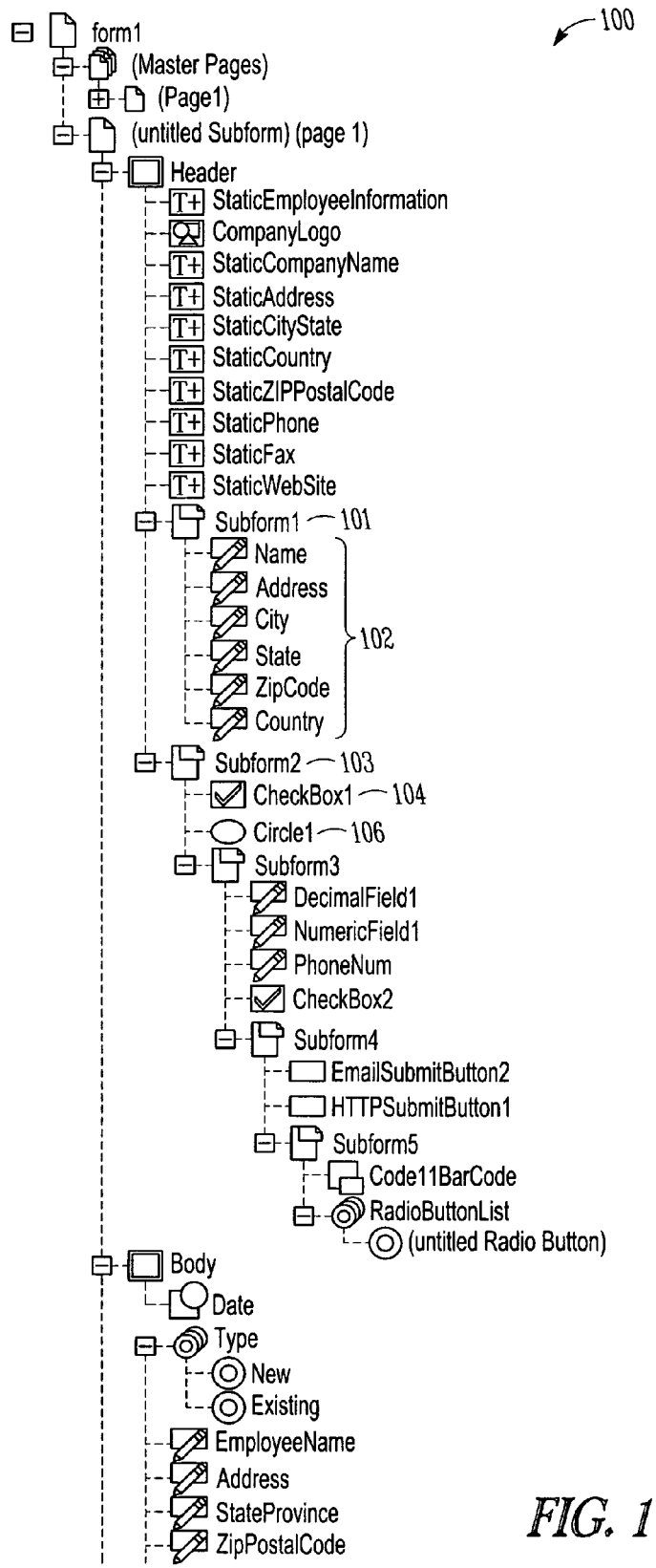
FIG. 1 depicts a graphical representation of objects included in a form that are organized in a hierarchal structure.

FIG. 1 depicts a graphical representation of objects included in a form that are organized in a hierarchal structure. In general, a "form," as used herein, refers to an electronic document with spaces or fields that may be written to or selected. Examples of forms include tax forms, expense report forms, employment application forms, inventory report forms, and other forms. The form may be in a variety of formats, such as Extensible Markup Language (XML), XML Data Package (XDP) file format, Excel worksheet (XLS), and other formats. It should be appreciated that a form is comprised of one or more objects. Objects are the building blocks of a form and generally provide functionality to a form. In an example, objects may provide a place to enter text or a button upon which a selection may be made, such as a text field object, a button object, a check box object, and a list box object. Other objects may, for example, provide graphics to a form, such as a line object, a circle object, and a rectangle object. Objects may even provide the functionality to group other objects, such as container objects and subform objects, which are explained in more detail below.

The objects that comprise a form may be organized in a hierarchical structure, which is a system for ranking various objects. A graphical representation of an example hierarchical structure 100 is illustrated in FIG. 1. In the illustrated example, the hierarchical structure 100 can be a tree structure, where links branch out from one or more objects without forming closed loops. As depicted in FIG. 1, objects organized in the hierarchal structure 100 include, for example, subform objects (e.g., Subform1 101 and Subform2 103), checkbox objects (e.g., CheckBox1 104), decimal field objects, circle objects (e.g., Circle1 106), company logo objects, header objects, and text field objects (e.g., Name, Address, City, State, ZipCode, and Country 102). Each object included in the hierarchal structure 100 is ranked relative to each other object. For example, the text field objects 102 are included in the Subform1 object 101 and, as a result, the text field objects 102 are subordinate to the Subform1 object 101. In another example, a Checkbox1 object 104 and a Circle1 object 106 included in a Subform2 object 103 and therefore, the Checkbox1 object 104 and the Circle1 object 106 are subordinate to the Subform2 object 103.

The objects are organized in a hierarchical structure 100 for a variety of purposes. As an example, objects are ranked relative to each other such that the objects may be grouped in one or more organizational units. An "organizational unit," as used herein, refers to a classification of objects into an entity. Generally, an organizational unit can be used in form design to provide additional functionality that individual objects typically cannot provide. An example of an organizational unit is a container object, which is an object that can include or contain other objects. The container object may be used to group objects together such that this group can operate independent of other groups. Container objects provide a way to organize a complex form. Additionally, container objects can span multiple forms and, as a result, can also be used to encapsulate dynamically extracted data that may span multiple forms.

Another example of an organizational unit is a subform object (or subform), which is a section of a form that provides anchoring, layout, and/or geometry management for objects. Subforms may be used to organize a form into different sections. More than one subform may be used in a form and it should be noted that subforms may be placed inside other subforms. As an example, a subform may be created that is configured to receive address information. If other forms need the same address information, then the subform may be duplicated and included in other forms such that the objects included within the subform do not need to be re-created.

Figure 2:
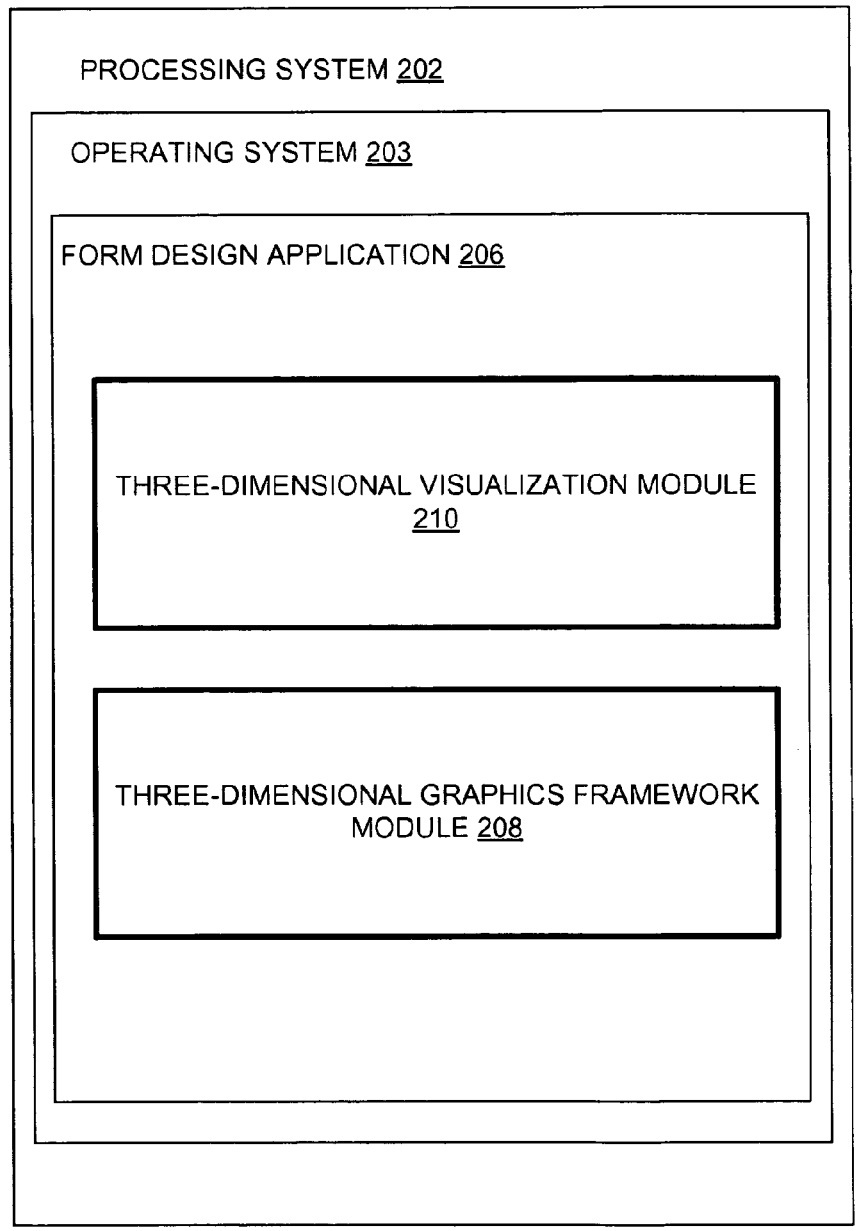
FIG. 2 depicts a block diagram of a form design application, in accordance with an example embodiment, included in a processing system that is configured to visually represent forms during form design.

FIG. 2 depicts a block diagram of a form design application 206, in accordance with an example embodiment, included in a processing system 202 that is configured to visually represent one or more forms during form design. It should be appreciated that the processing system 202 may be deployed in the form of a variety of computing devices, such as personal computers, laptop computers, and server computers. In various example embodiments, the processing system 202 may be used to implement computer programs, logic, applications, methods, processes or other software to visually represent forms in three dimensions, as described in more detail below.

The processing system 202 executes an operating system 203 that manages the software processes and/or services executing on the processing system 202. As depicted in FIG. 2, these software processes and/or services may include a form design application 206. In general, the form design application 206 provides software tools for creating interactive forms. The form design application 206 may include a three-dimensional graphics framework module 208 and a three-dimensional visualization module 210. The three-dimensional visualization module 210 is configured to display the objects that comprise a form in three dimensions. As will be explained in more detail below, the three-dimensional visualization module 210 further positions the three-dimensional representations of the objects relative to each other based on the hierarchal relationships between the objects.

The three-dimensional graphics framework 208 is a wrapper library that allows application programming interfaces associated with computer graphics to be used in a variety of different environments. The three-dimensional visualization module 210 interfaces with the three-dimensional graphics framework module 208 to render the graphical representations of the objects in three dimensions. An example of a three-dimensional graphics framework module 208 is an Open Graphics Library (OpenGL) Wrapper that emulates application programming interface calls through OpenGL commands and other platform specific commands.

It should be appreciated that in other embodiments, the form design application 206 may include fewer, more, or different modules apart from those depicted in FIG. 2. For example, in an example embodiment, the three-dimensional graphics framework module 208 may be merged with the three-dimensional visualization module 210 into a single module.

Figure 3:
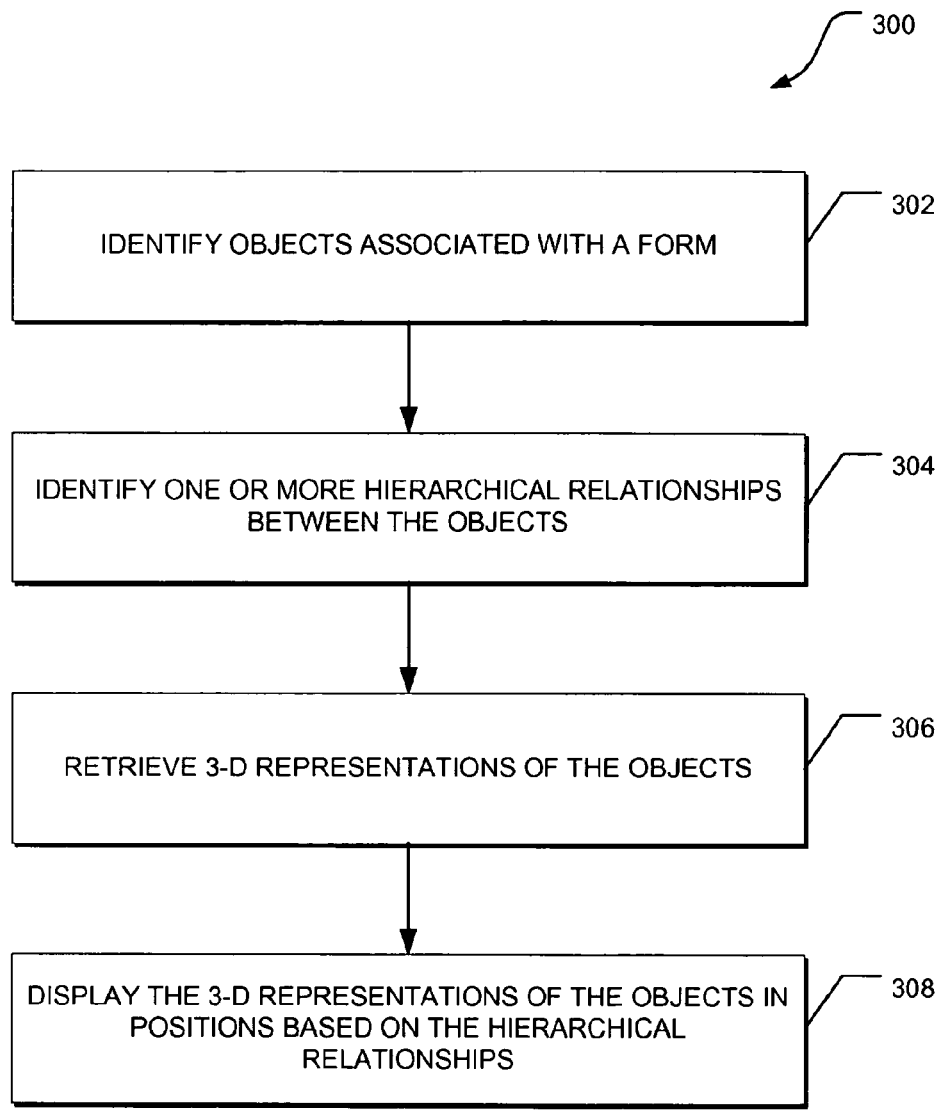
FIG. 3 depicts a flow diagram of a general overview of a method, in accordance with an example embodiment, for visually representing a form.

FIG. 3 depicts a flow diagram of a general overview of a method, in accordance with an example embodiment, for visually representing a form. In an example embodiment, the method 300 may be implemented by the three-dimensional visualization module 210 and the three-dimensional graphics framework module 208 of FIG. 2 and employed in the processing system 202.

As depicted in FIG. 3, one or more objects associated with the form are identified at 302. The definitions of the objects are stored in the form and, as a result, the objects may be identified by loading the form and reading the defined objects. One or more hierarchal relationships between the objects are also identified at 304. The hierarchal structure of the objects, which defines the hierarchal relationships between the objects, may also be defined in the form. For example, objects that comprise the form may be defined in a particular format and the format itself may define the hierarchal structure of the objects. For example, objects defined in a form may be based on the XML format that provides for the nesting of objects. This nesting is used to derive the hierarchal structure and ultimately, the hierarchal relationships between the objects.

After the objects are identified, three-dimensional representations of the objects are retrieved at 306. A "three-dimensional representation," as used herein, is a graphical, three-dimensional model of an object (or a form) and such model may be created with the use of a variety of three-dimensional modeling software. A three-dimensional representation may be constructed for every object and such three-dimensional representation may be stored in the form design application or in another location. With the objects identified, the form design application searches for the three-dimensional representations associated with those objects and displays the three-dimensional representations at 308. As explained in more detail below, the positions of the objects as displayed are based on the hierarchal relationships between the objects.

Figure 4A:
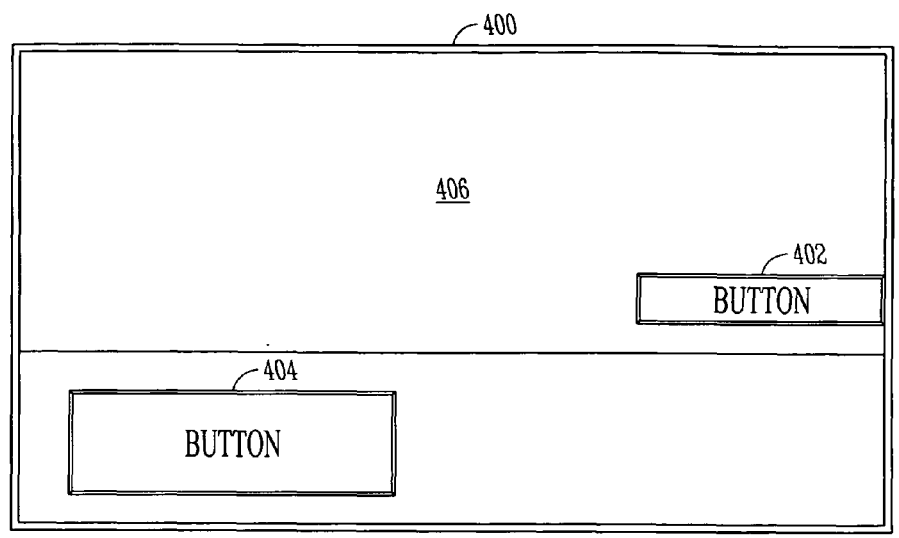
FIGS. 4A and 4B depict graphical representations of objects, in accordance with example embodiments, included in an example form.
Figure 4B:
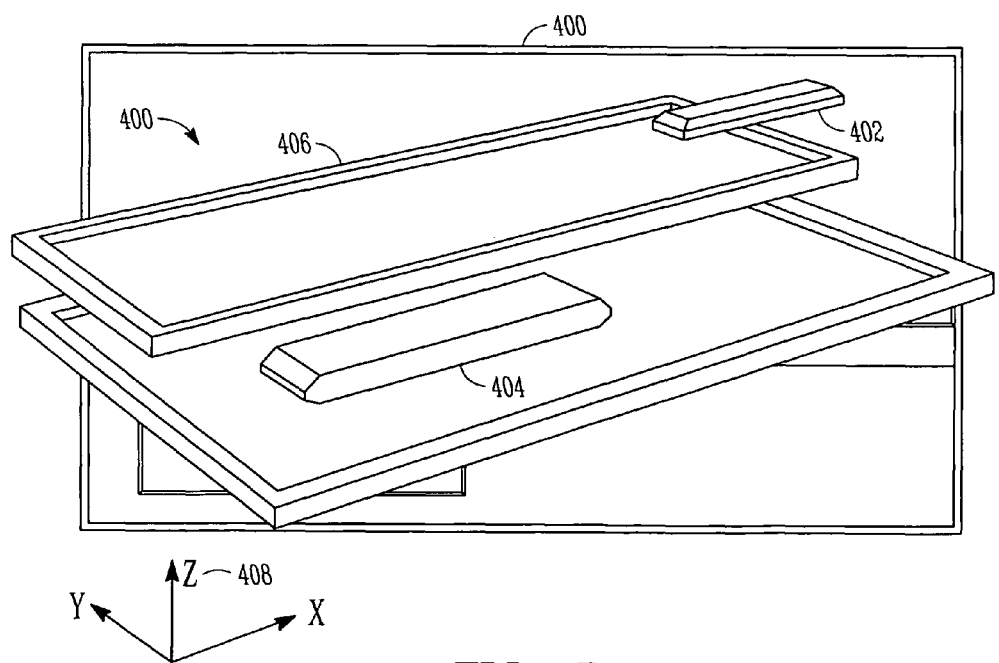

FIGS. 4A and 4B depict graphical representations of objects 402, 404, and 406, in accordance with example embodiments, included in an example form 400. FIG. 4A depicts two-dimensional representations of objects 402, 404, and 406 included in the example form 400, which includes button objects 402 and 404 and a rectangular object 406. A "two-dimensional representation," as used herein refers to a graphical, two dimensional image of an object (or a form). In the two-dimensional representations depicted in FIG. 4A, the hierarchal relationships between the button objects 402 and 404 and the rectangular object 406 are not shown.

However, FIG. 4B depicts three-dimensional representations of the same objects 402, 404, and 406 that visually show the hierarchal relationships between the objects 402, 404, and 406. A user can select to view three-dimensional representations of the objects 402, 404, and 406 depicted FIG. 4A. Upon such a selection, in an example embodiment, the view depicted in FIG. 4A may be directly replaced with a view of the three-dimensional representations of the objects 402, 404, and 406, which are depicted in FIG. 4B. In an alternate example embodiment, the view depicted in FIG. 4A may transition to the view depicted in FIG. 4B with animation of the objects 402, 404, and 406 that starts from the top or overhead view depicted in FIG. 4A and then rotating into the perspective view depicted in FIG. 4B for a duration of approximately one or more seconds. As depicted in FIG. 4B, the three-dimensional representations of the objects 402, 404, and 406 are positioned relative to each other based on the hierarchal relationships between the objects 402, 404, and 406. The objects 402, 404, and 406 are positioned along a vertical Z axis 408 (or a direction perpendicular to the X-Y plane) based on the hierarchal relationships. In this example hierarchal structure, the rectangular object 406 and the button object 404 are ranked equally while the button object 402 is ranked higher than the rectangular object 406 and the button object 404. As a result, both the rectangular object 406 and the button object 404 are positioned along the same plane while the button object 402 is positioned on a higher plane along the vertical Z axis 408.

The three-dimensional representations of the objects 402, 404, and 406 are displayed such that they appear to be viewed from a three-point perspective. In a three-point perspective, the graphical representations of the objects 402, 404, and 406 include three vanishing points. In reference to the X, Y, and Z Cartesian axes depicted in FIG. 4B, a three-point perspective exists when a picture plane is not parallel to any of the three X, Y, and Z axes. From a three-point perspective, the hierarchal relationships between the objects 402, 404, and 406 can be visually identified based on the positioning of the objects 402, 404, and 406 along the vertical Z axis 408. In another example embodiment, the three-dimensional representations of the objects 402, 404, and 406 are rotatable around, for example, the vertical Z axis 408, the X axis or the Y axis. As a result, the three-dimensional representations may be rotated to provide views from different perspectives, such as from a one-point perspective, which includes one vanishing point, or from a two-point perspective, which includes two vanishing points.

In an example embodiment, the two-dimensional representation as depicted in FIG. 4A may also be displayed with the three-dimensional representation. For example, as depicted in FIG. 4B, the two-dimensional representations of the objects 402, 404, and 406 are overlaid over the three-dimensional representations of the objects 402, 404, and 406. Alternatively, the two dimensional representations may be displayed separately from the three-dimensional representations, but located in the same display. As an example, the two-dimensional representations may be displayed on half a screen while the three-dimensional representations may be displayed on the other half of the same screen. The display of both the two-dimensional representations and the three-dimensional representations together provides a complete view of the form 400 as the two-dimensional representations show the actual or final rendering of the form 400 while the three-dimensional representations show the hierarchal relationships between the objects 402, 404, and 406. In an example embodiment, either the two-dimensional representations or the three-dimensional representations of the objects 402, 404, and 406 may be made semi-transparent such that both representations are visible.

Figure 5A:
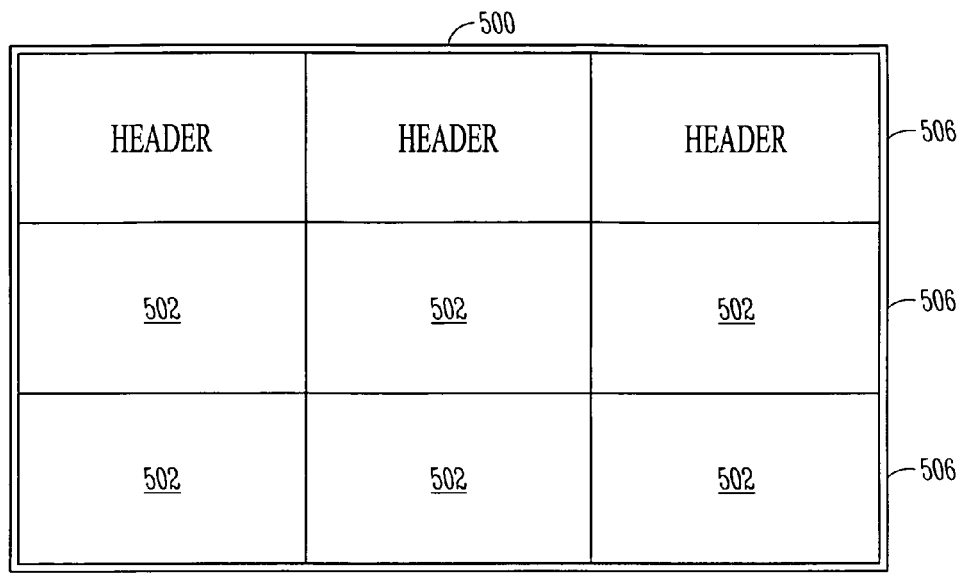
FIGS. 5A, 5B, and 5C depict graphical representations of objects, in accordance with an example embodiment, that comprise another example form.
Figure 5B:
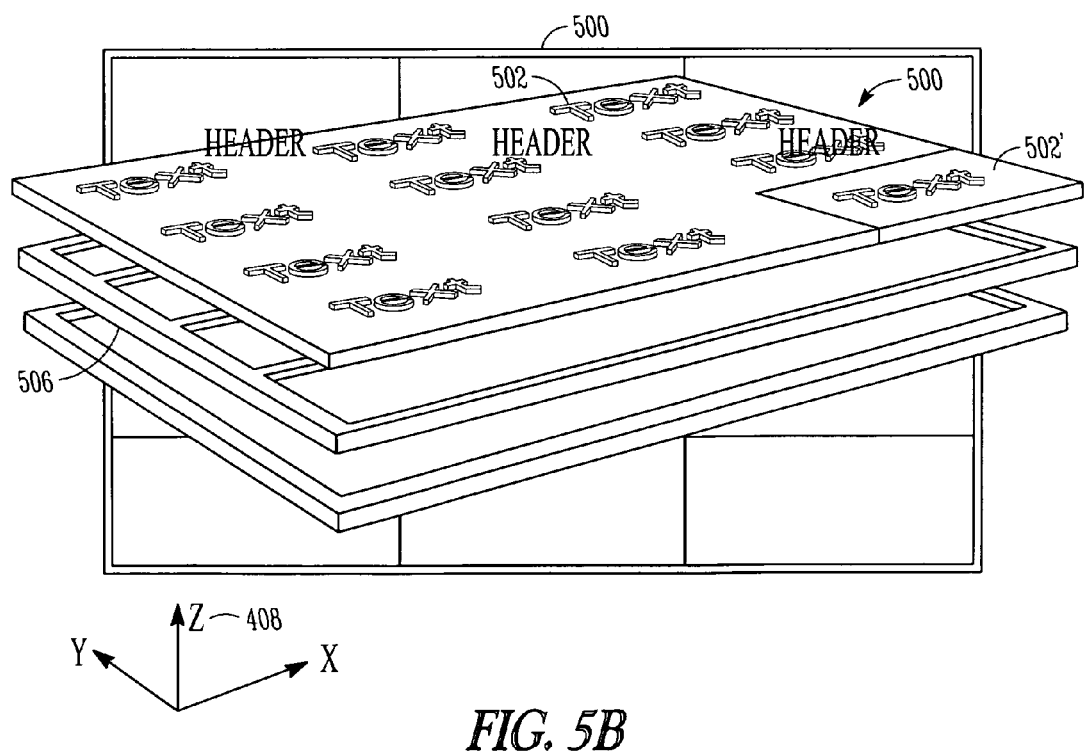

FIGS. 5A and 5B depict graphical representations of objects 502 and 506, in accordance with an example embodiment, that comprise another example form 500. FIG. 5A depicts a two-dimensional representation of an example form 500 in the form of a table, which is a set of data elements organized in rows and columns. The example form 500 is comprised of row objects 506 and text field objects 502 that enable a user to input text in each individual element or row of the table.

In an example embodiment, the objects 502 and 506 that comprise the form 500 may also be displayed in three dimensions. FIG. 5B depicts three-dimensional representations of the same objects 502 and 506 from a three-point perspective view that shows the hierarchal relationships between the objects 502 and 506. The hierarchal relationships between the objects 502 and 506 can be visually identified based on the positioning of the three-dimensional representations of the objects 502 and 506 along the vertical Z axis 408. In the example of FIG. 5B, the three-dimensional representations of the text objects 502 are positioned higher than the three-dimensional representations of the row objects 506. As a result, the text objects 502 are ranked higher than the row objects 506 in the hierarchical structure.

When designing a form, for example, a user may select a particular object for editing. In an example embodiment, the three-dimensional representations are selectable. For example, if a user wants to edit a particular text field object 502, then the user may click on the three-dimensional representation of the text field object 502. The three-dimensional representation of the text field object 502 may be highlighted upon selection and, in an example, embodiment, the user may directly edit the text field object 502 from the three-dimensional representation. In another example embodiment, the selection may trigger a switch to a two-dimensional representation of the text field object 502. As an example, the user may select the three-dimensional representation of the text field object 502 and in response, the view switches to a two-dimensional representation of the text field object 502, such as the two-dimensional representation depicted in FIG. 5A. From this two-dimensional representation, the user may edit the selected text field object 502.

Figure 5C:
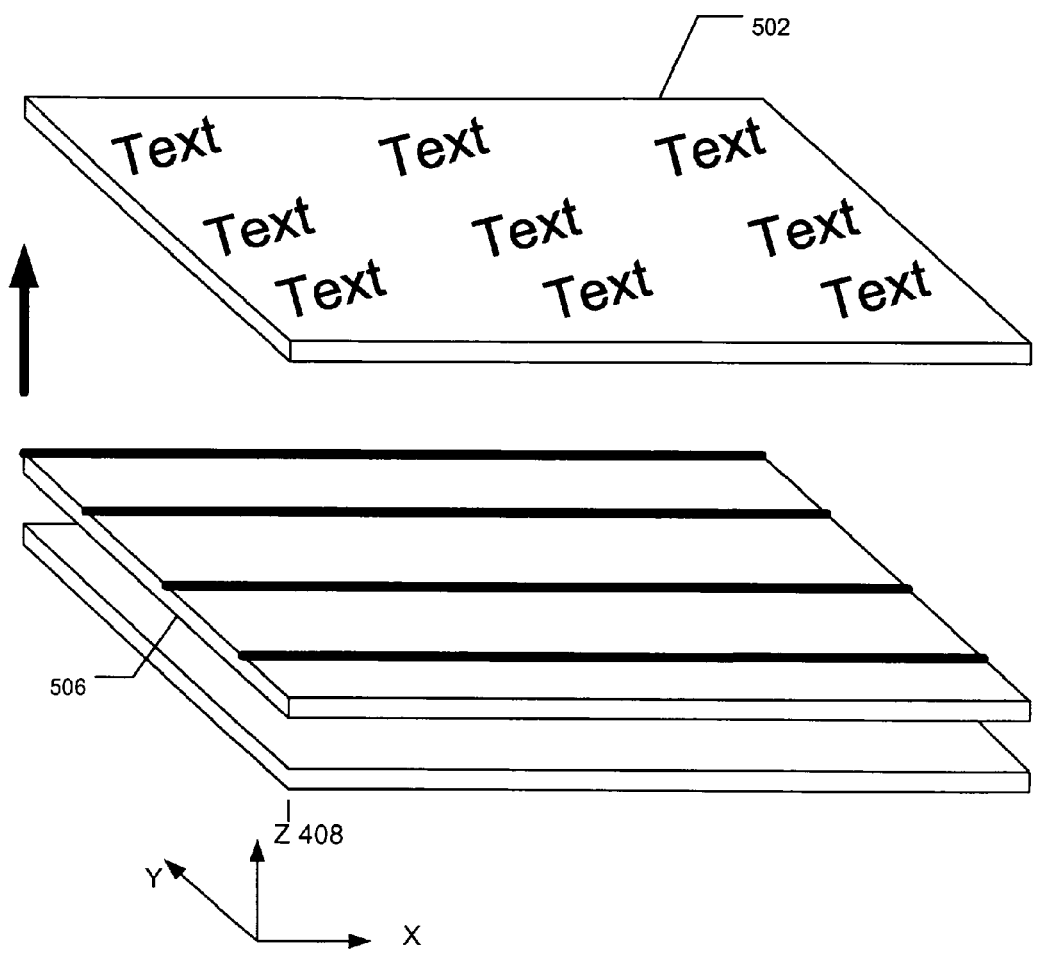

In the three-dimensional view, some three-dimensional representations of objects, may be blocked from view by three-dimensional representations of other objects. For example, as depicted in FIG. 5B, the three-dimensional representations of the row objects 506 are partially blocked by the three-dimensional representations of the text field objects 502 because of the limited spacing between the three-dimensional representations and also because the three-dimensional representations are viewed from a three-point perspective. In an example embodiment, one or more three-dimensional representations of the objects 502 and 506 may be moved such as to provide an unobstructed view of the three-dimensional representations of the objects 502 and 506. For example, as depicted in FIG. 5C, the three-dimensional representations of the text field objects 502 may be moved along a direction in the vertical Z axis 408 such that all the three-dimensional representations of the row objects 506 are visible. It should be appreciated that in other example embodiments, the three-dimensional representations may also be moved in a variety of other directions, such as in a direction along the X-axis or the Y-axis.

Figure 6:
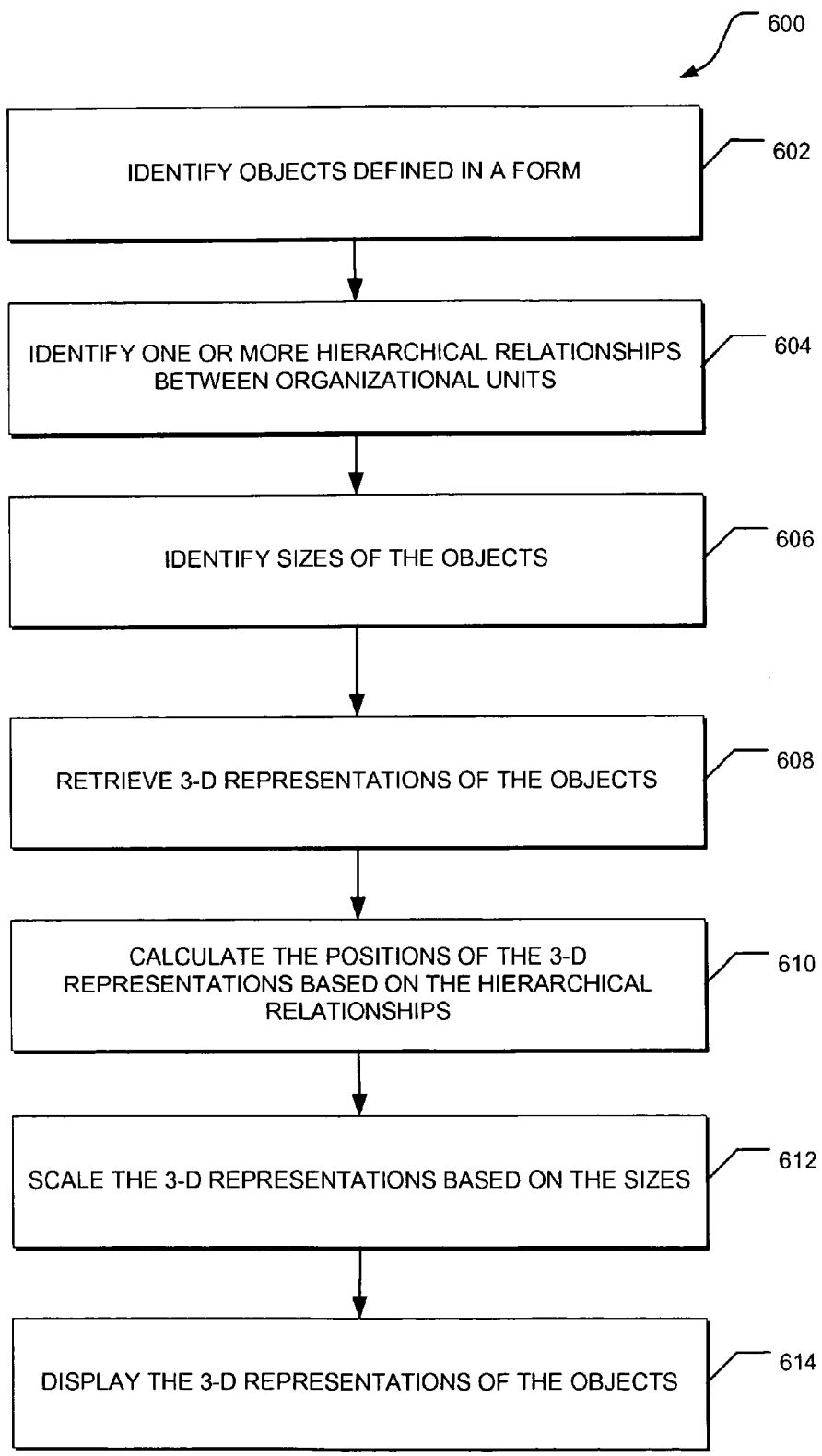
FIG. 6 depicts a flow diagram of a detailed method, in accordance with an example embodiment, of visually representing a form.

FIG. 6 depicts a flow diagram of a detailed method 600, in accordance with an example embodiment, of visually representing a form. Initially, the objects defined in a form are identified at 602. A portion of the objects are associated with one or more organizational units and, in this example, the organizational units are organized in a hierarchal structure. For example, a portion of the objects may be grouped in one or more container objects. In another example, the portion of the objects may be grouped in one or more subforms.

The hierarchal relationships between the organizational units are identified at 604 and such hierarchal relationships may be based on the hierarchal structure of the organizational units. As an example, a form may include two subforms, namely a first subform and a second subform. When defined in the form, the second subform and its associated objects are nested within the first subform. The hierarchal relationship therefore identifies the second subform being subordinate to the first subform.

In an example embodiment, the sizes of the objects are identified at 606. It should be appreciated that the form may define locations of objects within the form and also sizes of the objects. A form may include coordinates or other values that define the locations and sizes of the objects. As an example, defined with a rectangular object are the coordinates for one corner of the rectangular object and additional coordinates for an opposite corner, which define both the location and size of the rectangular object. In another example, defined with a circle object are the coordinates of the center of the circle object and a radius, which define both the location and size of the circle object.

With the objects identified, the three-dimensional representations of the objects are retrieved at 608 and the positions of the three-dimensional representations relative to each other are calculated at 610. Here, the positions of the three-dimensional representations are configured to provide a visual representation of the hierarchal relationships between the objects. Accordingly, as described above, the positions of the three-dimensional representations are based on the hierarchal relationships between the objects. The positions calculated may be along a vertical direction where the heights of the objects identify the rankings of the objects. In the example above where the form includes a first subform and a second subform, the second subform is positioned below the first subform because the hierarchal relationship identifies that the second subform is subordinate to the first subform.

Still referring to FIG. 6, the three-dimensional representations are then scaled at 612 based on the identified sizes. For example, a size of a particular three-dimensional representation may be scaled to a smaller or larger size in proportion to the size identified from the form. The scaled three-dimensional representations of the objects are then displayed at 614 with each of the three-dimensional representations positioned in the display based on the identified hierarchical relationships.

Figure 7:
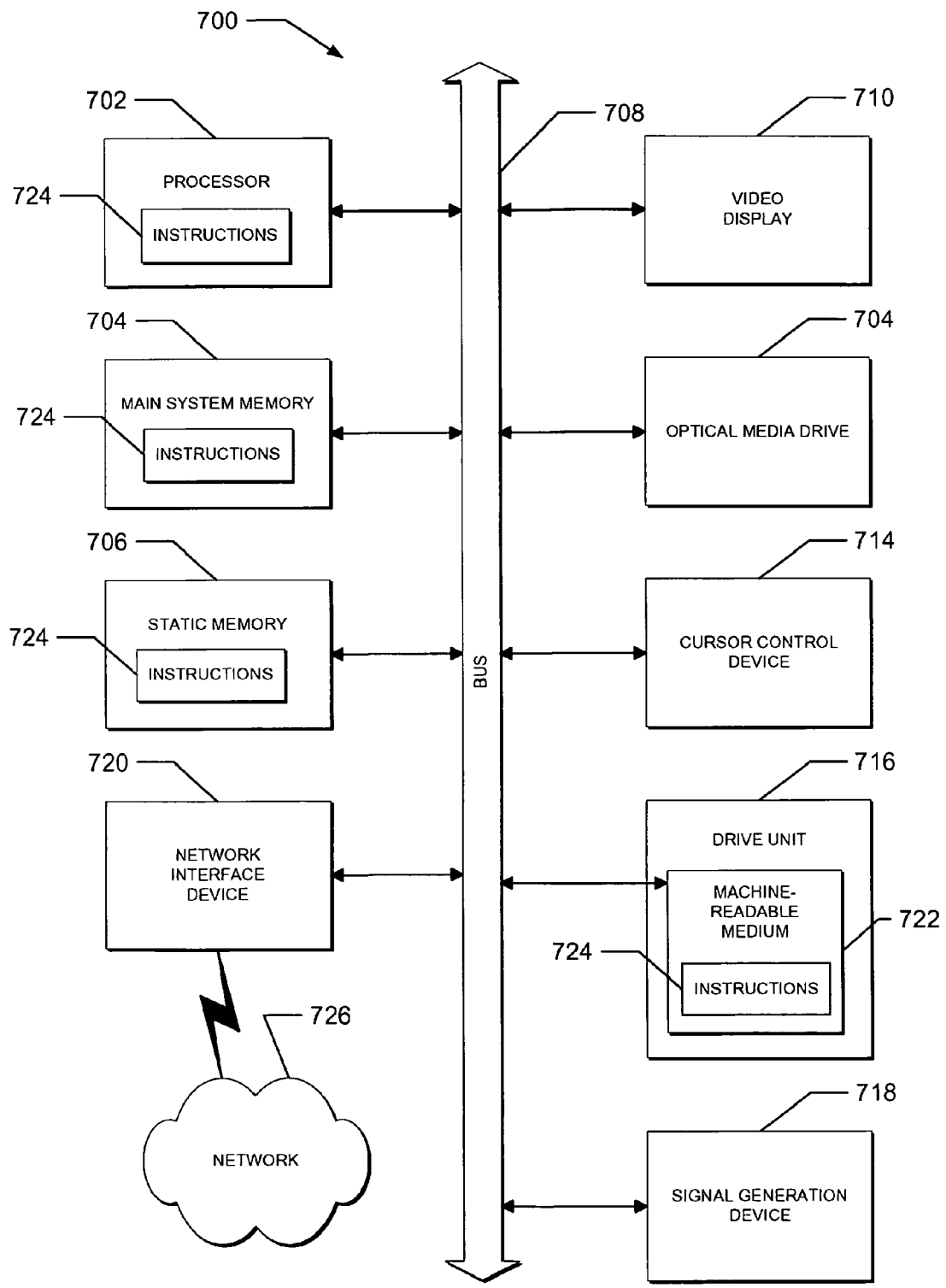
FIG. 7 is a block diagram of a machine in the example form of a processing system within which a set of instructions, for causing the machine to perform any one or more of the methodologies discussed herein, may be executed.

FIG. 7 is a block diagram of a machine in the example form of a processing system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 700 includes processor 702 (e.g., a central processing unit (CPU), a graphics processing unit (GPU) or both), main memory 704 and static memory 706, which communicate with each other via bus 708. The processing system 700 may further include video display unit 710 (e.g., a plasma display, a liquid crystal display (LCD) or a cathode ray tube (CRT)). The processing system 700 also includes alphanumeric input device 712 (e.g., a keyboard), user interface (UI) navigation device 714 (e.g., a mouse), disk drive unit 716, signal generation device 718 (e.g., a speaker) and network interface device 720.

A disk drive unit 716 includes machine-readable medium 722 on which is stored one or more sets of instructions and data structures (e.g., software 724) embodying or utilized by any one or more of the methodologies or functions described herein. Software 724 may also reside, completely or at least partially, within main memory 704 and/or within processor 702 during execution thereof by the processing system 700, main memory 704 and processor 702 also constituting machine-readable, tangible media.

Software 724 may further be transmitted or received over network 726 via network interface device 720 utilizing any one of a number of well-known transfer protocols (e.g., HTTP).

While machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for visually representing a form may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of visually representing a form, the method comprising:
   identifying a plurality of objects in the form;
   identifying a hierarchical relationship between the plurality of objects;
   upon selection, using at least one processor, displaying a two-dimensional representation of the form including a two-dimensional representation of each object of the plurality of objects and the hierarchical relationship between the plurality of objects, the hierarchical relationship between the plurality of objects being shown by a position of the two-dimensional representation of each object in the two-dimensional representation of the form;
   upon the selection, retrieving a three-dimensional representation of each of the plurality of objects in the two-dimensional representation of the form, the three-dimensional representation of each of the plurality of objects being a three-dimensional model generated using three-dimensional modeling; and
   displaying a three-dimensional representation of the form including the three-dimensional representation of each object of the plurality of objects of the two-dimensional representation of the form and the hierarchical relationship between the plurality of objects, the hierarchical relationship between the plurality of objects in the three-dimensional representation being shown by a position of the three-dimensional representation of each object in the three-dimensional representation of the form.

2. The method of claim 1, further comprising displaying the two-dimensional representation of the form with the three-dimensional representation of the form.

3. The method of claim 2, wherein the two-dimensional representation of each object of the plurality of objects is overlaid over the three-dimensional representation of each object of the plurality of objects.

4. The method of claim 1, wherein the plurality of objects comprises one or more of a container object, a text field object, a button object, a check box object or a list box object.

5. The method of claim 1, wherein each three-dimensional representation of each object of the plurality of objects is selectable and wherein the method further comprises transitioning between the three-dimensional representation of each object of the plurality of objects and the two-dimensional representation of each object of the plurality of objects based on a selection.

6. The method of claim 1, wherein the three-dimensional representation of each object of the plurality of objects is displayed from a three-point perspective in the three-dimensional representation of the form.

7. A non-transitory, machine-readable medium that stores instructions, which when performed by a machine, cause the machine to perform operations comprising:
identifying a first object defined in a form, the first object being in a first organizational unit;
identifying a second object defined in the form, the second object being in a second organizational unit;
identifying a hierarchical relationship between the first organizational unit and the second organizational unit;
upon selection, using at least one processor, displaying a two-dimensional representation of the form including a two-dimensional representation of the first object, a two-dimensional representation of the second object, and the hierarchical relationship between the first organizational unit and the second organizational unit, the hierarchical relationship between the first organizational unit and the second organizational unit being shown by a position of the two-dimensional representation of the first object in the two-dimensional representation of the form and a position of the two-dimensional representation of the second object in the two-dimensional representation of the form;
upon the selection, retrieving a three-dimensional representation of the first object in the two-dimensional representation of the form and a three-dimensional representation of the second object in the two-dimensional representation of the form, the three-dimensional representation of the first object and the three-dimensional representation of the second object being three-dimensional models generated using three-dimensional modeling of each object in the plurality of objects; and
displaying a three-dimensional representation of the form including the three-dimensional representation of the first object, the three-dimensional representation of the second object, and the hierarchical relationship between the first organizational unit and the second organizational unit, the hierarchical relationship between the first organizational unit and the second organizational unit being shown by a position of the three-dimensional representation of the first object in the three-dimensional representation of the form and a position of the three-dimensional representation of the second object in the three-dimensional representation of the form.

8. The non-transitory, machine-readable medium of claim 7, wherein the first organizational unit is subordinate to the second organizational unit, and wherein the first and second organizational units are displayed in the form, the first organizational unit being positioned below the second organizational unit in the three-dimensional representation of the form.

9. The non-transitory, machine-readable medium of claim 7, wherein the three-dimensional representation of the first object is positioned along a plane and the three-dimensional representation of the second object is positioned along a separate plane.

10. The non-transitory, machine-readable medium of claim 7, wherein the instructions, when performed by the machine, cause the machine to perform operations comprising:
identifying a size of the first object;
scaling the three-dimensional representation of the first object based on the size.

11. The non-transitory, machine-readable medium of claim 7, wherein the first object, the first organizational unit, the second object, and the second organizational unit are defined in the form based on a hierarchical structure, the hierarchical relationship being based on the hierarchical structure.

12. The non-transitory, machine-readable medium of claim 7, wherein the first organizational unit is a container object.

13. A processing system comprising:
at least one processor; and
a memory in communication with the at least one processor, the memory being configured to store a form design application that is executable by the at least one processor, the form design application having instructions, that when executed by the at least one processor, cause operations to be performed, comprising:
identifying a plurality of objects in the form;
identifying a hierarchical relationship between the plurality of objects;
upon selection, using at least one processor, displaying a two-dimensional representation of the form including a two-dimensional representation of each object the plurality of objects and the hierarchical relationship between the plurality of objects, the hierarchical relationship between the plurality of objects being shown by a position of the two-dimensional representation of each object in the two-dimensional representation of the form;
upon the selection, retrieving a three-dimensional representation of each of the plurality of objects in the two-dimensional representation of the form, the three-dimensional representation of each of the plurality of objects being a three-dimensional model generated using three-dimensional modeling; and
displaying, a three-dimensional representation of the form including the three-dimensional representation of each object of the plurality of objects of the two-dimensional representation of the form and the hierarchical relationship between the plurality of objects, the hierarchical relationship between the plurality of objects in the three-dimensional representation being shown by a position of the three-dimensional representation of each object in the three-dimensional representation of the form.

14. The processing system of claim 13, wherein the three-dimensional representation of each object of the plurality of objects is rotatable.

15. The processing system of claim 13, wherein the plurality of objects is defined in the form based on an Extensible Markup Language (XML) format.

16. The processing system of claim 13, wherein the instructions, that when executed by the at least one processor, cause further operations to be performed, comprising:
   identifying a plurality of sizes associated with the plurality of objects; and
   scaling the three-dimensional representation of each object of the plurality of objects based on at least one of the plurality of sizes.

17. The processing system of claim 13, wherein the instructions, that when executed by the at least one processor, cause further operations to be performed, comprising displaying the three-dimensional representation of each object of the plurality of objects overlaid over the two-dimensional representation of each object of the plurality of objects.

18. The processing system of claim 17, wherein the three-dimensional representation of each object of the plurality of objects is semi-transparent.

* * * * *